United States Patent
Bennett et al.

(10) Patent No.: US 7,246,267 B2
(45) Date of Patent: Jul. 17, 2007

(54) LOGIC ANALYZER HAVING A DISASSEMBLER EMPLOYING SYMBOL TABLE INFORMATION FOR IDENTIFYING OP-CODES

(75) Inventors: David L. Bennett, Aloha, OR (US); Robert J. Heath, Aloha, OR (US); Mark L. Millard, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 573 days.

(21) Appl. No.: 10/262,227

(22) Filed: Sep. 30, 2002

(65) Prior Publication Data

US 2003/0065976 A1    Apr. 3, 2003

Related U.S. Application Data

(60) Provisional application No. 60/326,548, filed on Oct. 1, 2001.

(51) Int. Cl.
G06F 11/00    (2006.01)
(52) U.S. Cl. .............................. 714/39; 714/49; 714/51; 717/125; 717/127
(58) Field of Classification Search ................. 714/39, 714/49, 51; 717/125, 127, 131
See application file for complete search history.

(56) References Cited

U.S. PATENT DOCUMENTS

| | | | | |
|---|---|---|---|---|
| 4,694,420 A | * | 9/1987 | Pettet et al. ................. 717/131 |
| 4,937,740 A | * | 6/1990 | Agarwal et al. ............... 714/38 |
| 5,287,548 A | * | 2/1994 | Flood et al. ................... 700/18 |
| 5,321,828 A | * | 6/1994 | Phillips et al. ................ 703/28 |
| 5,611,044 A | * | 3/1997 | Lundeby ....................... 714/38 |
| 5,649,201 A | * | 7/1997 | Kitadate ..................... 717/131 |
| 5,854,924 A | * | 12/1998 | Rickel et al. ............... 717/132 |
| 5,946,484 A | * | 8/1999 | Brandes ....................... 717/136 |
| 5,960,201 A | * | 9/1999 | Ma et al. ..................... 717/154 |
| 5,963,740 A | * | 10/1999 | Srivastava et al. .......... 717/130 |
| 6,014,513 A | * | 1/2000 | Voelker et al. ............. 717/131 |
| 6,016,556 A | * | 1/2000 | Heath ........................... 714/38 |
| 6,282,701 B1 | * | 8/2001 | Wygodny et al. ........... 717/125 |
| 6,311,327 B1 | * | 10/2001 | O'Brien ...................... 717/114 |
| 6,393,606 B1 | * | 5/2002 | Davila et al. ............... 717/127 |
| 6,708,169 B1 | * | 3/2004 | Berry et al. .................... 707/7 |
| 6,877,156 B2 | * | 4/2005 | Osborne et al. ............. 717/143 |
| 6,886,156 B2 | * | 4/2005 | McCormack ................ 717/136 |
| 2003/0065976 A1 | * | 4/2003 | Bennett et al. ................ 714/35 |

FOREIGN PATENT DOCUMENTS

WO    WO 90/01738    * 2/1990

* cited by examiner

*Primary Examiner*—Scott Baderman
*Assistant Examiner*—Joshua Lohn
(74) *Attorney, Agent, or Firm*—Thomas F. Lenihan (57) ABSTRACT

A logic analyzer according to the subject invention includes a disassembler for disassembling object code. The disassembler automates the process of locating op-code addresses by utilizing information derived from an object file corresponding to the code whose execution is being disassembled. The object file includes addresses for the starting location of op-codes corresponding to individual source code lines. When the disassembler cannot determine the correct starting location for an op-code, it uses information from the object file to obtain the address of an op-code within a specified range of interest.

8 Claims, 7 Drawing Sheets

```
#   TLA Symbol File
#   From file: "demo.x"

#      TSF Format        Type     Display Radix   File Radix   Offset
#   ================   =======   =============   ==========   ========
#+  Version 2.0.000     RANGE         HEX            HEX       00000000

#+ Function
#            Symbol Name                      Low       High
# ====================================    ========  ========
_main                                     00c05000  00c05000
main                                      00c05000  00c0509b
_light_leds                               00c0509c  00c0509c
_pause                                    00c050a8  00c050a8
_initQueue                                00c050ca  00c050ca
initQueue                                 00c050ca  00c050d7
_destroyQueue                             00c050d8  00c050d8
destroyQueue                              00c050d8  00c050e5
_enqueue                                  00c050e6  00c050e6
enqueue                                   00c050e6  00c05127
_dequeue                                  00c05128  00c05128
dequeue                                   00c05128  00c05167
_queueEmpty                               00c05168  00c05168
queueEmpty                                00c05168  00c0517d
_queueFull                                00c0517e  00c0517e
queueFull                                 00c0517e  00c0519d
_atexit                                   00c0519e  00c0519e
__atexit_functs                           00c051cc  00c051cc
__START                                   00c05248  00c05248
__cxxfini                                 00c0535c  00c0535c
ENTRY                                     00c0535e  00c0535e
__exit                                    00c053b2  00c053b2
_fclose                                   00c053be  00c053be
_fflush                                   00c05450  00c05450
_free                                     00c054ba  00c054ba
__initcopy                                00c0556a  00c0556a
__aldiv                                   00c05622  00c05622
__ldiv                                    00c05626  00c05626
__auldiv                                  00c0565e  00c0565e
__uldiv                                   00c05662  00c05662
__aulrem                                  00c056c2  00c056c2
__ulrem                                   00c056c6  00c056c6
__alrem                                   00c056de  00c056de
__lrem                                    00c056e2  00c056e2
_memset                                   00c0571e  00c0571e
__OUTCHR                                  00c05782  00c05782
__sim_out_break                           00c0578a  00c0578a
_close                                    00c0578c  00c0578c
__exit_abort                              00c05790  00c05790
_exit                                     00c057d2  00c057d2
_write                                    00c05820  00c05820
```

Fig. 4a

```
#+ Variable
#        Symbol Name                    Low       High
# ============================      ========  ========
literals                             00c05000  00c0509b
__sig_functs                         00c0585c  00c05873
__membase                            00c05874  00c0587b
__badlist                            00c0587c  00c0587f
__iob                                00c05880  00c059bf
__xtm                                00c059c0  00c059e3
__environ                            00c059e4  00c059e7
_rear                                00c059e8  00c059eb
__atexit_top                         00c059ec  00c059ef
__atexit_stack                       00c059f0  00c05a6f
__randx                              00c05a70  00c05a73
__ctbuf                              00c05a74  00c05a8f
__avail                              00c05a90  00c05a93
__lastp                              00c05a94  00c05a97
_front                               00c05a98  00c05a9b
_errno                               00c05a9c  00c05a9f
_queue                               00c05aa0  00c05b03
__simulated_input                    00c05b04  00c05b04
__simulated_output                   00c05b05  00c05b05
__HEAP                               00c05b06  00c05b09
__stack                              00c0b000  ffffffff
```

Fig. 4b

```
#+ Source demo.c
# Line    Low       High      Beg  End  Symbol Name
# ====    ========  ========  ===  ===  ============
    23    00c05000  00c05007    0    1  # demo.c_23_1
    32    00c05008  00c0500d    0   44  # demo.c_32_44
    35    00c0500e  00c05013    0   20  # demo.c_35_20
    36    00c05014  00c05019    0   20  # demo.c_36_20
    37    00c0501a  00c0501f    0   20  # demo.c_37_20
    38    00c05020  00c05025    0   20  # demo.c_38_20
    39    00c05026  00c0502b    0   20  # demo.c_39_20
    40    00c0502c  00c05031    0   20  # demo.c_40_20
    43    00c05032  00c05037    0   13  # demo.c_43_13
    46    00c05038  00c05039    0   15  # demo.c_46_15
    47    00c0503a  00c0503d    0   26  # demo.c_47_26
    48    00c0503e  00c0504d    0   24  # demo.c_48_24
    46    00c0504e  00c0504f   32   36  # demo.c_46_32
    46    00c05050  00c05057   16   31  # demo.c_46_16
    58    00c05058  00c0505f    0   26  # demo.c_58_26
    59    00c05060  00c05067    0   28  # demo.c_59_28
    60    00c05068  00c0506f    0   20  # demo.c_60_20
    61    00c05070  00c05081    0   25  # demo.c_61_25
    57    00c05082  00c0508b    0   32  # demo.c_57_32
    65    00c0508c  00c05091    0   16  # demo.c_65_16
    67    00c05092  00c0509b    0    1  # demo.c_67_1
```

Fig. 5a

```
#+ Source queue.c
# Line    Low       High      Beg  End  Symbol Name
# ====    ========  ========  ===  ===  ============
    20    00c050ca  00c050cf    0   13  # queue.c_20_13
    21    00c050d0  00c050d5    0   12  # queue.c_21_12
    22    00c050d6  00c050d7    0    1  # queue.c_22_1
    32    00c050d8  00c050dd    0   13  # queue.c_32_13
    33    00c050de  00c050e3    0   12  # queue.c_33_12
    34    00c050e4  00c050e5    0    1  # queue.c_34_1
    43    00c050e6  00c050e9    0    1  # queue.c_43_1
    45    00c050ea  00c050f5    0   27  # queue.c_45_27
    46    00c050f6  00c050f9    0   20  # queue.c_46_20
    49    00c050fa  00c0510f    0   38  # queue.c_49_38
    50    00c05110  00c05121    0   27  # queue.c_50_27
    51    00c05122  00c05123    0   19  # queue.c_51_19
    53    00c05124  00c05127    0    1  # queue.c_53_1
    63    00c05128  00c05133    0   28  # queue.c_63_28
    64    00c05134  00c0513f    0   17  # queue.c_64_17
    67    00c05140  00c05155    0   36  # queue.c_67_36
    69    00c05156  00c05165    0   23  # queue.c_69_23
    71    00c05166  00c05167    0    1  # queue.c_71_1
    80    00c05168  00c0517b    0   21  # queue.c_80_21
    86    00c0517c  00c0517d    0    1  # queue.c_86_1
    94    00c0517e  00c0519b    0   42  # queue.c_94_42
   100    00c0519c  00c0519d    0    1  # queue.c_100_1
```

LOGIC ANALYZER HAVING A DISASSEMBLER EMPLOYING SYMBOL TABLE INFORMATION FOR IDENTIFYING OP-CODES

CLAIM FOR PRIORITY

The subject application claims priority from U.S. Provisional Patent Application Ser. No. 60/326,548 METHOD FOR USING SYMBOL TABLE INFORMATION TO IDENTIFY OP-CODES DURING DISASSEMBLY (David L. Bennett, et al.) filed 01 Oct. 2001.

FIELD OF THE INVENTION

This invention relates to test and measurement systems and, more particularly, to a disassembler for use in a logic analyzer for more precisely determining the starting address of assembly language code statements running on a system under test.

BACKGROUND OF THE INVENTION

In earlier days, engineers typically wrote control code for test and measurement systems in assembly language, a low-level language. Today, however, to improve development time and to enable the creation of programs having greater functionality and complexity to be developed in shorter time, engineers typically employ high-level languages, for example C, C++, etc. The high-level language is converted into machine code for operation on the particular processor, by a compiler/assembly/linker system, which generates assembly language and/or machine code based on the high-level source code.

Unfortunately, when debugging the program, the engineer must work with the low-level machine code. The low-level machine code is a series of binary numbers, or hexadecimal codes (base 16) and is not easy to understand. Typically, the machine code is reconverted to assembly language by a disassembler program to aid the engineer to understand the code that he is viewing.

However, the engineer did not write the software in assembly language. Moreover, the engineer may be unfamiliar with the methods employed by the compiler to generate assembly language code corresponding to various source code statements. Thus, it becomes complicated for the engineer to understand the exact operation of the system during a debugging operation.

Substantially all computer programs must be debugged because of their complexity, and because human programmers make mistakes. Computer code that performed well in simulation may fail to perform adequately under "real world" conditions for a variety of reasons, such as the relative unpredictability of the timing and form of real world input signals. Traditional software debuggers perform disassembly of code residing on the system under test (also known as the target system) and aid in the troubleshooting of code that is not performing as expected. Disassembly of computer code is the process of converting machine code back into assembly language for ease of understanding by a programmer or engineer troubleshooting a problem. Software debugger based disassemblers typically have access to the target system memory by way of an emulator probe or serial connection, such as through a JTAG port. Using this access, they are able to perform disassembly based on the memory image in the target system, translating the code found there into higher-level assembly language.

Disassembler software can also be run on a logic analyzer, such as a TLA 700 Series Logic Analyzer, manufactured by Tektronix, Inc. of Beaverton, Oreg. Such a disassembler running on a logic analyzer is described in U.S. Pat. No. 6,016,556, entitled SYSTEM FOR IDENTIFYING AN ACQUISITION SAMPLE CORRESPONDING TO A SOURCE CODE STATEMENT, (Heath), issued 18 Jan. 2000, assigned to the same assignee as the subject invention, and hereby incorporated by reference. Disassembler software running on a logic analyzer translates low-level machine code, of the target system under test, into easy-to-understand higher-level language as a troubleshooting aid to the user of the logic analyzer. Unfortunately, a disassembler running in a logic analyzer does not have access to the memory of the system under test. It therefore cannot operate on an image of that memory to translate the code. Moreover, a logic analyzer cannot interrogate the system under test to determine the contents of a particular memory location. A logic analyzer can only monitor bus traffic on the target system, and attempt to interpret the binary data that it acquires from the bus.

In a logic analyzer, the process of disassembly involves converting acquired bus transaction records into a listing of assembly language instructions that, when executed, would have generated that bus activity. This conversion process is sometimes ambiguous as a result of a variety of circumstances such as insufficient transaction history, variable length instructions, and lack of an instruction fetch indicator. When any of these conditions occur, the conversion process will most likely suffer. That is, the conversion process sometimes makes an incorrect assumption about where a new assembly language instruction, known as an op-code, actually begins. The disassembler often mistakes data or address information for an op-code, and consequently incorrectly disassembles the given set of bus transactions, because the disassembler was pointed to an incorrect starting address.

To compensate for this ambiguity, disassemblers currently provide a mechanism known as "mark op-code", which enables a user to manually indicate the correct starting address for an assembly language instruction. There are two significant problems with this solution. First, users must recognize when the displayed disassembly trace is incorrect and then figure out where it went wrong in order to know where to place the op-code mark. This can be confusing and error prone because the user is usually looking at unfamiliar code. Second, users must manually mark numerous such locations as they examine different parts of an acquisition trace. This manual marking procedure can be cumbersome and time consuming, especially because the user must frequently "jump" to new locations in the acquisition buffer that have not been previously disassembled. What is needed is a disassembler for a logic analyzer that more efficiently, more precisely, and automatically resolves most of these starting address ambiguities.

SUMMARY OF THE INVENTION

A logic analyzer according to the subject invention includes a disassembler for disassembling object code. The disassembler automates the process of locating op-code addresses by utilizing information derived from an object file corresponding to the code whose execution is being disassembled. The object file includes addresses for the starting location of op-codes corresponding to individual source code lines. When the disassembler cannot determine the correct starting location for an op-code, it uses information from the object file to obtain the address of an op-code within a specified range of interest.

BRIEF DESCRIPTION OF THE DRAWING

FIG. 2 shows a screen display from the test instrument of FIG. 1, overlaid by a screen display of the computer of FIG. 1, as known from the prior art.

FIGS. 5a and 5b show a source line symbol table extracted from an object file showing starting addresses of source line statements in accordance with the subject invention.

DETAILED DESCRIPTION OF THE EMBODIMENTS

Figure 1:
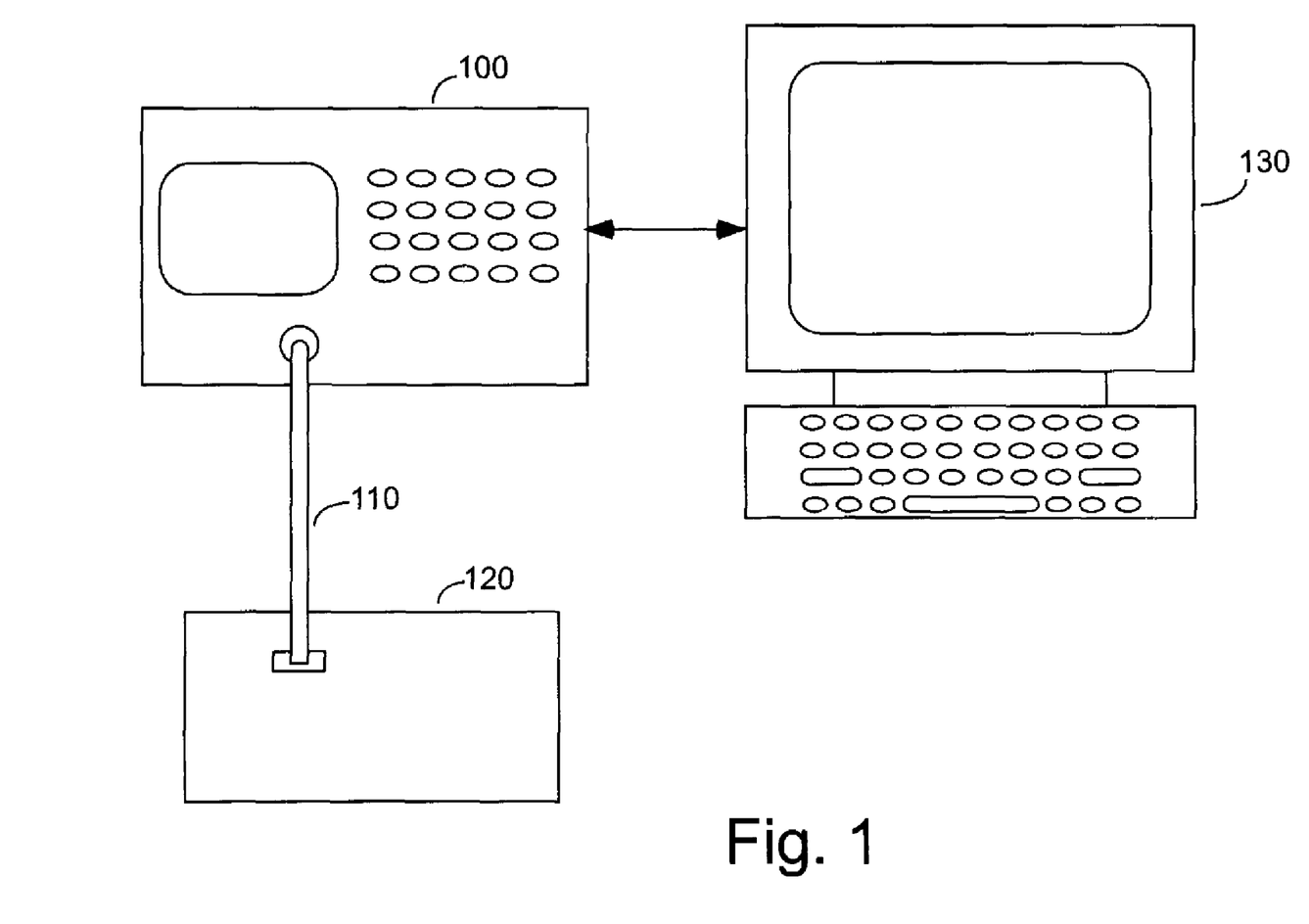
FIG. 1 is an illustration of a test setup, and for understanding the subject invention.

Referring to FIG. 1, a logic analyzer 100 is coupled to a system under test 120 (also known as a "target system", or simply "target") by a cable and probe arrangement 110 for receiving binary signals corresponding to transactions appearing on the bus of the target system. One skilled in the art will quickly realize that cable and probe arrangement 110 is shown in a highly simplified manner, and in reality, may encompass a multitude of cables and probes coupled to hundreds of test points. Logic analyzer 100 may also be coupled to, and communicate with, a computer system 130, or may operate in a stand-alone mode.

Referring to FIG. 2, a screen display 200 of logic analyzer 100 is overlaid by a screen display 230 of computer 130. Individual portions of these screen displays are highlighted to show a correspondence of a line of assembly code 60 of a program running on target system 120 with a particular line of high-level source code 58 of that same program. It is important to note that the source code file was entered into computer 130 in the normal fashion, but the object code was disassembled in logic analyzer 100 from object code acquired from bus transactions of target system 120. That is, assembly code screen display 200 of logic analyzer 100 was built up over time by acquiring signals indicative of bus transactions and interpreting those bus transactions to be op-codes, addresses, and data.

A detailed discussion of the operation of disassembler software is beyond the scope of this application. However, a brief high level description with reference to FIGS. 1 and 3 may be appropriate, as an aid in understanding the subject invention. During disassembly, raw data is acquired from a system under test via probe and cable arrangement 110 and applied to an acquisition portion (i.e., front end) 300 logic analyzer 100, and stored in an acquisition buffer (i.e., an array of memory locations) 310. A pointer of the disassembler is pointed to a location 320 in buffer 310 and the contents of location 320 are read and analyzed. The contents of following memory locations may also be read out for use in the analysis of the contents of memory location 320.

Figure 3:
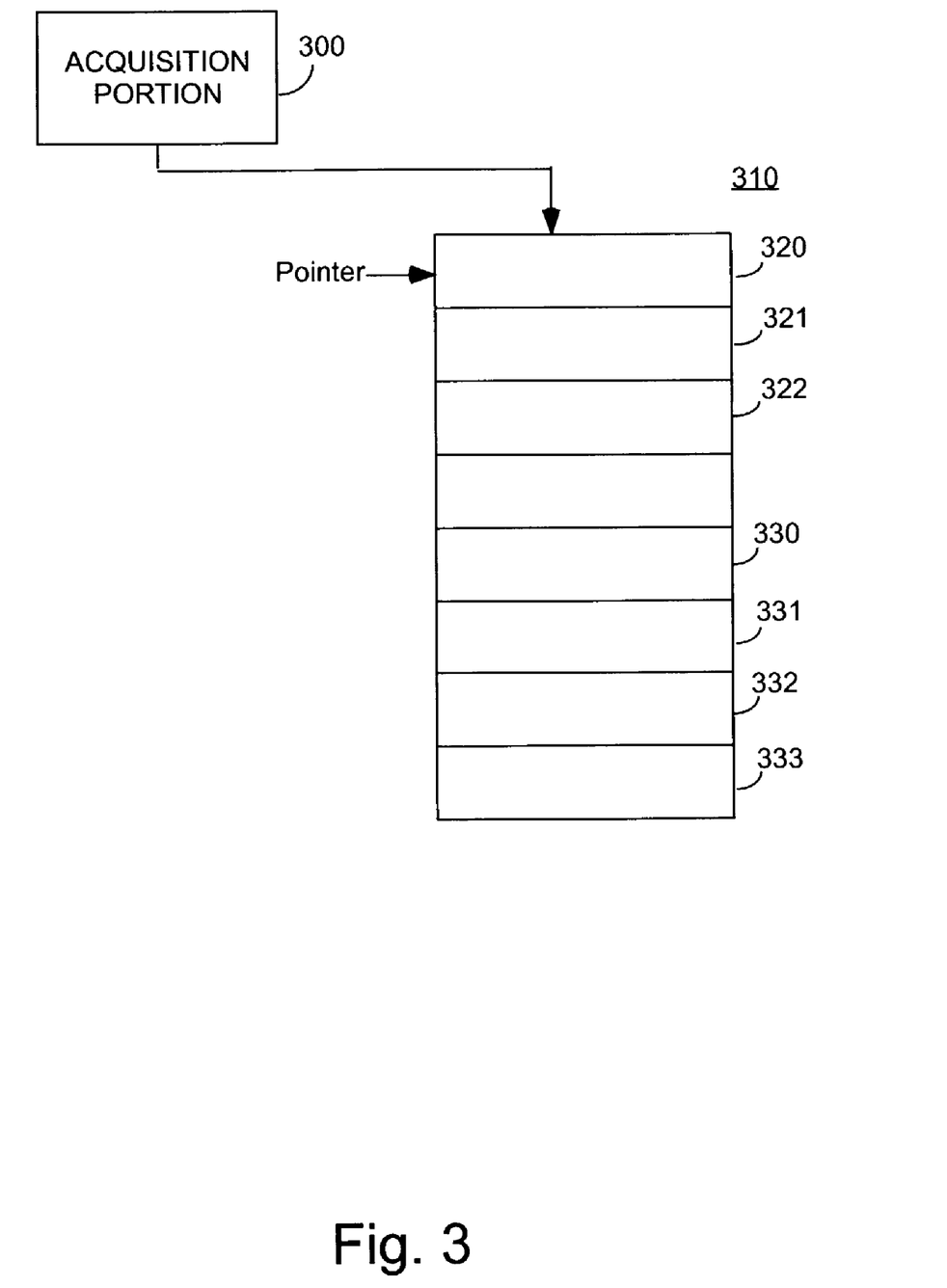
FIG. 3 shows an acquisition buffer of the test instrument of FIG. 1, as known from the prior art.
Figure 4A:
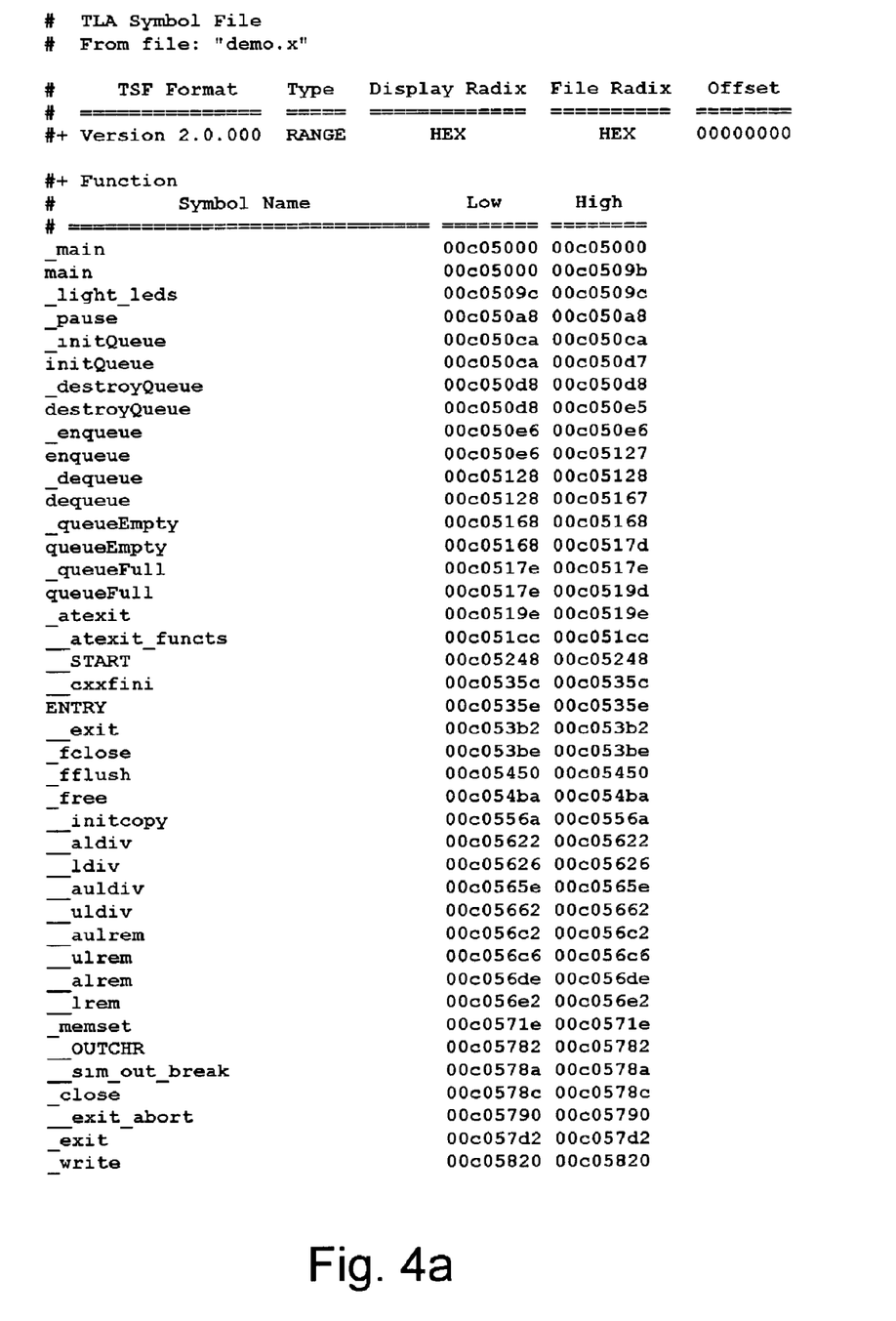
FIGS. 4a and 4b show function and variable symbol tables extracted from an object code file showing locations of functions and variables in accordance with the subject invention.
Figure 4B:
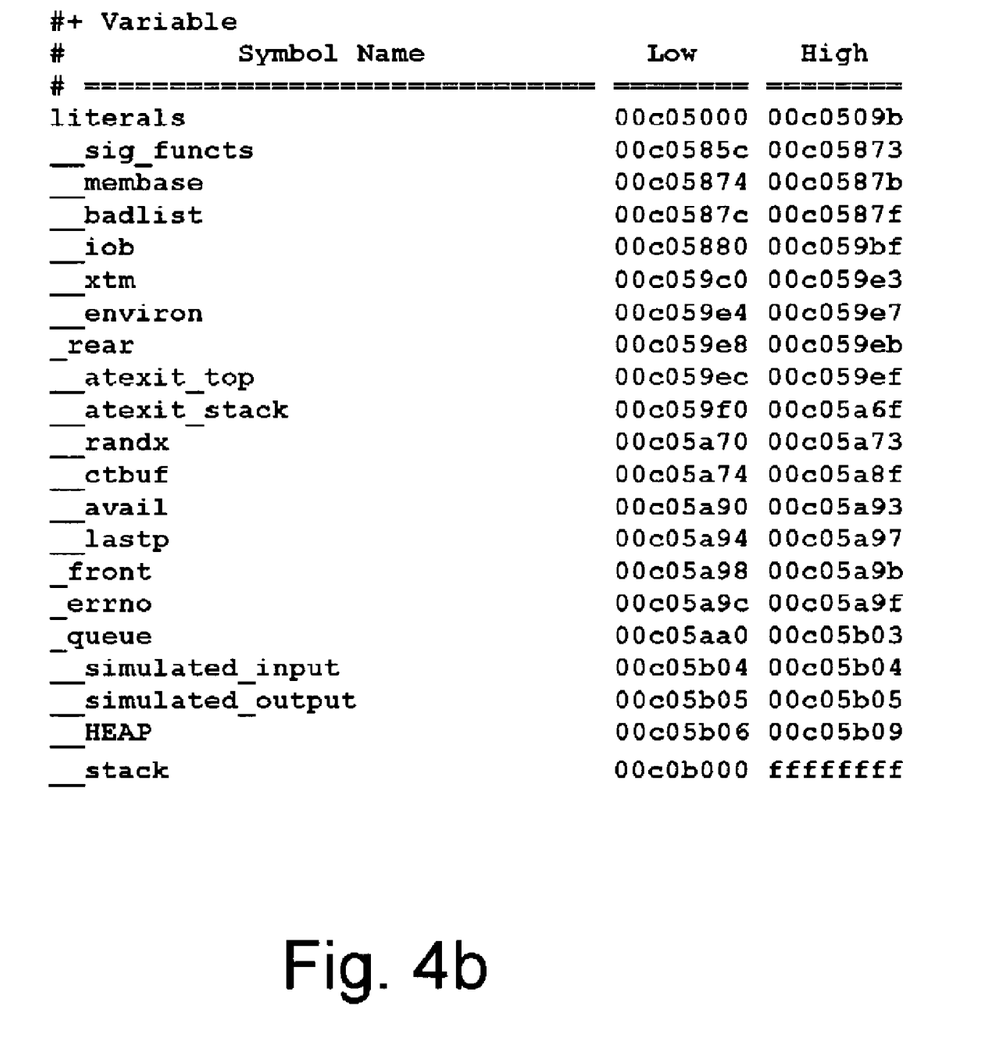

Disassemblers include tables of op-codes and their corresponding hexadecimal representation (i.e., machine code). The disassembler analyzes the contents of memory location 320 based upon the characteristics of known op-codes. For example, an upper address byte and a lower address byte normally follow an op-code instructing a microprocessor to jump to a new location. Thus, if a binary word is acquired and stored in memory location 320, and is identical to the op-code value for a jump instruction, then the next two bytes 321 322 will be examined. If the contents of the next two memory locations appear to constitute a valid address, then the analysis is confirmed. Consequently, the disassembler will assign that meaning to those three bytes, and move pointer to the next unanalyzed memory location 330.

As noted above, assembly code is written in human-readable form. Humans typically find it easier to relate to jump destinations and subroutines having names (i.e., labels) rather than relative addresses. For example, subroutine call to a subroutine labelled "light lamp" is easier to understand than a call to a subroutine at a particular numeric address. When code is assembled or compiled, resulting object code is generated. In addition, an object file called a symbol file is also generated and stored with the object code. The symbol file associates the label with the numeric address of the compiled or assembled code. Disassemblers make use of these symbol files to make the disassembled code more readable to humans by relabelling subroutines and variables after performing disassembly on the object code.

As already noted, the discussion above concerning the operation of disassemblers was necessarily simplified for ease of explanation. In fact, modern microprocessors do not fetch a single instruction at a time and do not necessarily operate on that instruction in the sequence in which it was fetched. For example, in an effort to increase operating speeds modern microprocessors fetch multiple instructions from memory at a time. It often happens that because of the outcome of a first instruction (perhaps a branch instruction wherein the branch was taken) the remaining fetched instructions will not be executed at all. Moreover, data resulting from an instruction may appear on the bus many cycles after the instruction that caused it to appear.

As noted above, conventional disassemblers operate on an image of the object code in memory, whereas a disassembler running on a logic analyzer does not have that advantage. Thus, a disassembler running on a logic analyzer is subject to ambiguities that are not experienced by a debugger based disassembler that has access to the memory image residing on the target system. Not only must the disassembler running on a logic analyzer translate the acquired data into assembly code, it must also sort out data that was placed on the bus of the target system out of sequence.

It is herein recognized that the symbol files can be used by a disassembler running on a logic analyzer to resolve address ambiguities encountered during disassembly of target system object code. That is, the information is currently extracted from object files and stored in an application symbol database for uses such as source code correlation and symbolic substitution, has not previously been used to assist in the disassembly process. It is also recognized herein that it may not be the address that is in question but rather whether the contents of that address represent an instruction (op-code) or data. The disassembly technique described herein improves on existing disassemblers used in logic analyzers by providing an alternate, automated, means for a disassembler running in a logic analyzer to identify resolve these ambiguities in a program running on a target system.

FIGS. 4a, 4b, 5a, and 5b form the symbol file (presented in a human readable form for purposes of explanation). This is the information that logic analyzer 100 uses at run-time to associate addresses with variable names, function names or source code lines. The subject invention makes use of this data to aid disassembly when traditional techniques fail.

Figure 6:
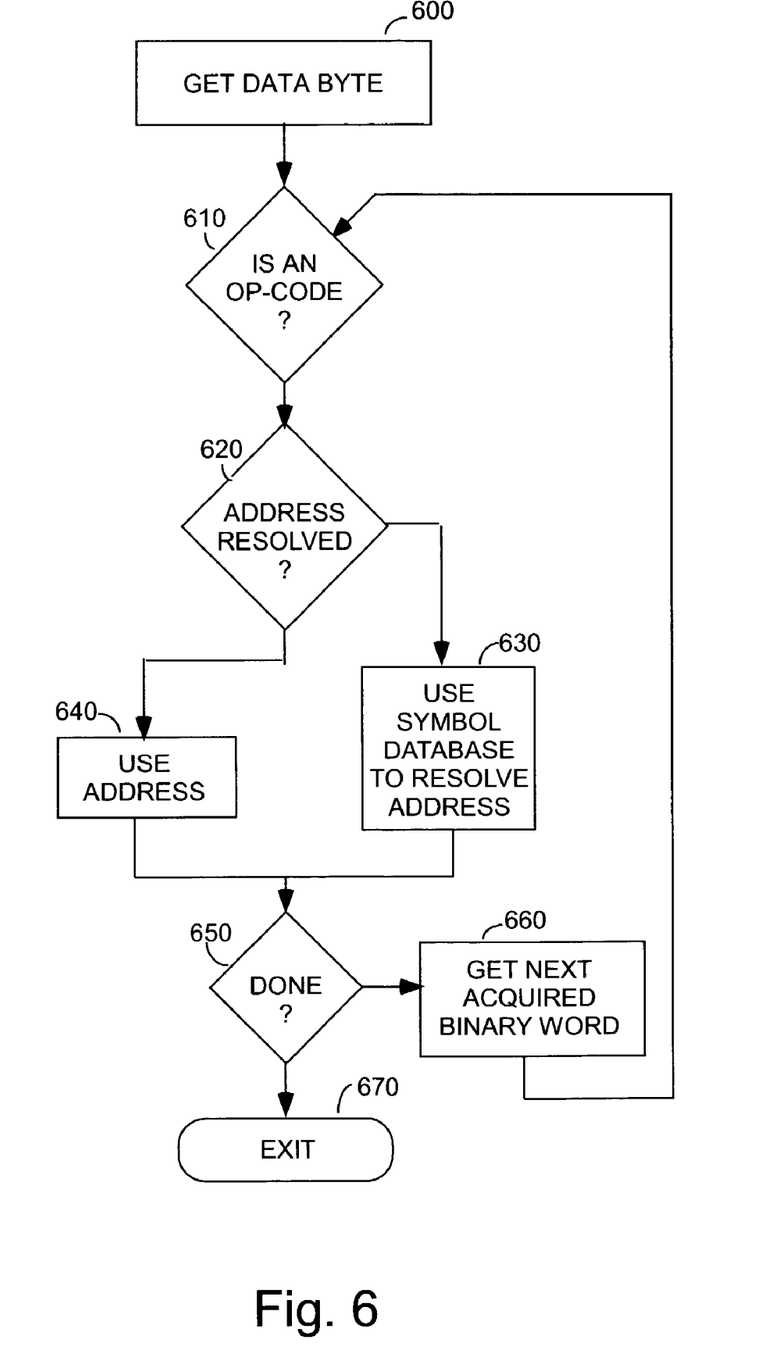
FIG. 6 is a simplified flow chart useful in understanding the subject invention.

The subject invention will now be described with respect to FIG. 3 and the simplified flowchart of FIG. 6. One skilled in the art will understand that the disassembler of logic analyzer 100 performs such functions as look ahead, and applies sophisticated heuristics when attempting to determine the starting address of an op-code. Such functions are not central to the subject invention and a description of them has been omitted for simplicity of explanation. The routine of FIG. 6 is entered at step 600 wherein a binary word is read from memory location 330. Assume that the disassembler recognizes the binary word as an op-code for a call to a subroutine (step 610). A high byte and a low byte of an address of the subroutine should follow such an op-code. Assume, for purposes of explanation, that the memory location 331 expected to contain the high byte of a subroutine actually contains a data word placed on the data bus between the op-code and its address bytes 332 333. The symbol database file includes addresses for the starting location of op-codes corresponding to individual source code lines. When the disassembler cannot determine the correct starting location for an op-code (step 620), it uses information from the object file (step 630) to obtain the address of an op-code within a specified range of interest. The disassembler then knows where the new instruction begins and is able to disassemble that section of the code correctly without user intervention. For example, the disassembler knows the starting addresses of all of the source statements. By reading in the next two bytes and comparing them to each of the starting addresses, it can identify the proper address for the subroutine call. If the address were resolved at step 620, then that address can be used directly at step 640. In either case, the routine advances to step 650 to determine if the disassembly is finished. If it is not finished, then the next data word is fetched step 660, and the routine begins again. If it is finished, the routine is exited at step 670.

What has been described is a novel disassembler for a logic analyzer, or the like, that eliminates much of the need for users to manually mark op-codes, and eliminates errors inherent in the manual process.

One skilled in the art will realize that use of the subject disassembler is not a complete replacement for the existing manual marking method because there will still be situations wherein no symbolic information exists for a given range of addresses. It is also possible that errors may exist in the symbol database that could lead to incorrect op-code identification. For these reasons, the new mechanism is viewed as an adjunct to the existing manual marking method, not as a replacement. Therefore, the subject invention includes the further feature that a user can override the results of the subject disassembler by manually marking incorrect op-codes.

What is claimed is:

1. A logic analyzer, comprising:
   an acquisition arrangement for acquiring signals representative of bus transactions from a system under test;
   said logic analyzer storing, analyzing, and interpreting said signals as object code statements of a program running on said system under test;
   said logic analyzer storing a symbol database relating to said program running on said system under test;
   said logic analyzer disassembling said object code statements into assembly code; and
   said logic analyzer using said symbol database to resolve ambiguities encountered in said disassembly of said object code.

2. The logic analyzer of claim 1, further comprising:
   a display unit for displaying said assembly code; and
   a data input for receiving data entered by a user for manually correcting a result of said disassembly of said object code.

3. A method for disassembling object code in a logic analyzer, comprising the steps of:
   acquiring signals representative of bus transactions from a system under test;
   storing, analyzing, and interpreting said signals as object code statements of a program running on said system under test;
   storing a symbol database relating to said program running on said system under test;
   disassembling said acquired object code statements into assembly code; and
   using said symbol database to resolve ambiguities encountered during said disassembly of said object code.

4. The method of claim 3, further comprising the steps of:
   displaying said assembly code on a display screen of said logic analyzer; and
   manually correcting an incorrectly disassembled line of said assembly code.

5. A logic analyzer, comprising:
   an acquisition arrangement for acquiring signals representative of bus transactions from a system under test;
   said system under test having a memory storing object code statements of a program running on said system under test, said logic analyzer having no access to said object code stored in said memory of said system under test;
   said logic analyzer storing, analyzing, and interpreting said signals representative of bus transactions as acquired object code statements of a said program running on said system under test;
   said logic analyzer storing a symbol database relating to said program running on said system under test;
   said logic analyzer disassembling said acquired object code statements into assembly code; and
   said logic analyzer using said symbol database to resolve ambiguities encountered in said disassembly of said acquired object code.

6. The logic analyzer of claim 5, further comprising:
   a display unit for displaying said assembly code; and
   a data input for receiving data entered by a user for manually correcting a result of said disassembly of said acquired object code.

7. A method for disassembling object code in a logic analyzer, comprising the steps of:
   acquiring signals representative of bus transactions from a system under test;
   said system under test having a memory storing object code statements of a program running on said system under test, said logic analyzer having no access to said object code stored in said memory of said system under test;
   storing, analyzing, and interpreting said signals representative of bus transactions as acquired object code statements of a program running on said system under test;
   storing a symbol database relating to said program running on said system under test;
   disassembling said acquired object code statements into assembly code; and
   using said symbol database to resolve ambiguities encountered during said disassembly of said acquired object code.

8. The method of claim 7, further comprising the steps of:
   displaying said assembly code on a display screen of said logic analyzer; and
   manually correcting an incorrectly disassembled line of said assembly code.

* * * * *